Sept. 29, 1925.
C. A. FETTERS
1,554,995
GRAPHOPHONE RECORD CONTAINER
Filed July 17, 1923
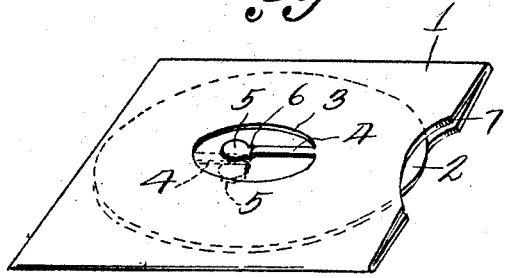
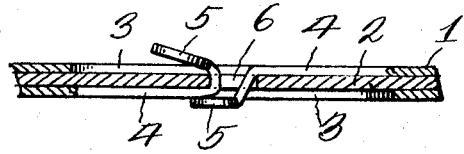
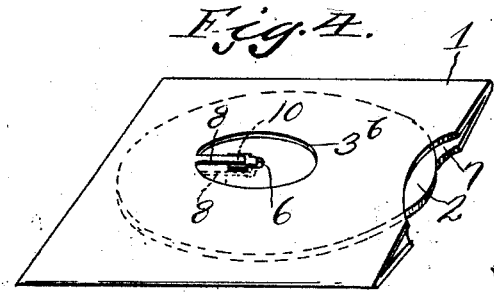
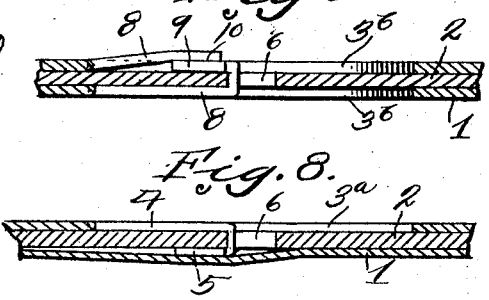
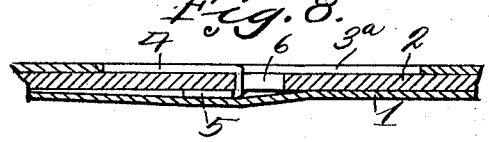
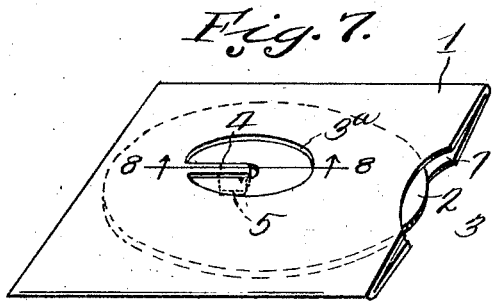
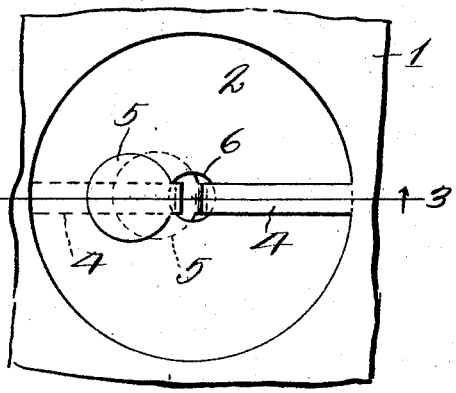
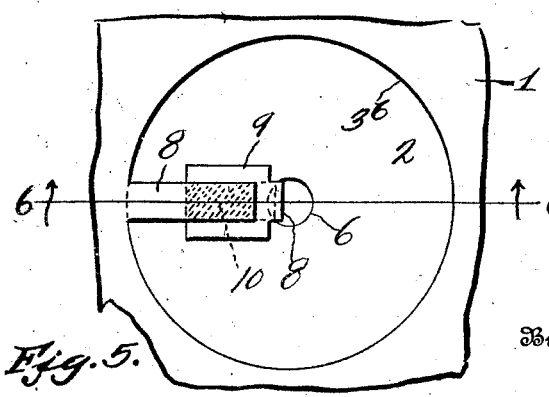
Inventor
Charles A. Fetters
By
Attorney Patented Sept. 29, 1925.

1,554,995

UNITED STATES PATENT OFFICE.

CHARLES A. FETTERS, OF WASHINGTON, DISTRICT OF COLUMBIA.

GRAPHOPHONE-RECORD CONTAINER.

Application filed July 17, 1923. Serial No. 652,078.

*To all whom it may concern:*

Be it known that CHARLES A. FETTERS, a citizen of the United States, residing at Washington, in the District of Columbia, has invented certain new and useful Improvements in Graphophone-Record Containers, of which the following is a specification, reference being had therein to the accompanying drawings.

The invention relates to graphophone record containers, and has for its object to provide a device of this character wherein graphophone records may be positively held within the container, and sealed therein if so desired in a manner whereby the record container when pulled out of a rack, the record therein will be prevented from falling out of the container, which is a common difficulty with containers as now constructed.

A further object is to provide means carried by the record container, and preferably formed integral therewith and extending through the spindle aperture in the record for holding said record within the container. The holding device comprises a tongue carried by the container and extending through the spindle aperture in the record, and preferably terminates in an enlarged end cooperating with the opposite side of the record for preventing the same from coming out of the spindle aperture.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1 is a perspective view of the container, showing a record therein and means for holding said record in said container.

Figure 2 is a top plan view of the central portion of the record container, and a portion of the record.

Figure 3 is a detail sectional view taken on line 3—3 of Figure 2.

Figure 4 is a perspective view of a modified form of container, wherein a positive sealing means is provided for the record.

Figure 5 is a top plan view of a central portion of the container shown in Figure 4.

Figure 6 is a transverse sectional view taken on line 6—6 of Figure 5.

Figure 7 is a perspective view of another modified form of container, wherein only one tongue is used having an enlargement at its end.

Figure 8 is a detail sectional view taken on line 8—8 of Figure 7.

Referring to the drawing, the numeral 1 designates a rectangular shaped graphophone container, preferably formed from heavy paper and 2 a record disposed therein. Where no holding means is provided for the record within the container 1, and the containers and records maintained in a cabinet and the like, it has been found that a great many records come out of the containers, drop on the floor and are broken. To obviate this difficulty, during the formation of the opening 3 in the opposite sides of the container 1, elongated tongues 4 are formed integral with the containers. Tongues 4 terminate in enlargements 5, which may be bent sufficiently so that they may easily pass through the spindle receiving aperture 6 in the record 2, to opposite sides of the record where, when they straighten out they will be disc shaped, and too large to pass through the aperture 6, consequently the record 2 is held in the container so that it cannot drop out of the container during the handling thereof. When it is desired to remove the record from the container the enlargements 5 may be again bent and pass through the apertures 6, and if so desired may be torn off entirely thereby allowing the record 2 to be easily pulled from the container, for instance where the tongues are used as a sealing means. In Figures 1 to 3 inclusive, the tongues 4 extend from diametrical opposite sides of the openings 3, and consequently it will be seen that movement outwardly within the container 1 is positively prevented.

Referring to Figures 7 and 8 wherein only one tongue 4 is used, the tongue is at the opposite side of the opening 3ª to the open end 7 of the container, and this form is particularly adapted for use where only one opening 3ª is provided in one side of the container 1, and by positioning the tongue 4 as above set forth, it is obvious that outward movement of the record 2 is prevented, otherwise the operation is the same as in Figures 1 to 3 inclusive.

Where it is desired to positively seal the record in the container 1, the form of container shown in Figures 4, 5 and 6 is used. In this form the oppositely disposed openings 3^b of the container 1, at the inner sides thereof are provided with integral tongues 8, one of which tongues is provided with an enlarged end 9 adapted to be passed through the record aperture 6, and the other tongue 8 to be adhesively joined at 10 thereto, thereby positively holding the record 2 within the container and sealing the same, consequently it will be seen that the manufacturer can insure the delivery of an unused record to a customer. It will be seen that the tongues 8 are disposed at the inner sides of the openings 3^b in relation to the open end 7 of the container 1, therefore outward movement of the record 2 is prevented, which would not be the case if said tongues were disposed at the opposite sides of the openings 3^b.

From the above it will be seen that a record container is provided having record holding means formed therewith, which will positively hold records within the containers and if so desired the records may be sealed within the container, thereby preventing the record from being removed from the container and replaced therein.

The invention having been set forth what is claimed as new and useful is:—

1. The combination with a record container having openings in opposite walls thereof, a record disposed within said container and having a spindle receiving aperture therein, of tongues carried by the container and extending through the spindle aperture and forming means for holding the record within the container.

2. The combination with a record container having openings in opposite walls thereof, a record disposed within said container and having a spindle receiving aperture therein, of tongues carried by the container and formed from pliable material, the ends of said tongues being enlarged and extending through the spindle aperture and disposed on opposite sides of the record.

3. The combination with a record container having an opening in the wall thereof, a record disposed within said container and having a spindle receiving aperture therein, a tongue carried by said container and extending through the spindle receiving aperture, said tongue terminating in an enlargement larger than the spindle receiving aperture.

4. The combination with a record container having oppositely disposed openings in the walls thereof, a record disposed within said container and having a spindle receiving aperture therein, of integral tongues carried by said container at opposite sides of the openings therein, said tongues extending through the spindle receiving aperture and forming means for holding said record within the container.

5. The combination with a record container having oppositely disposed openings in the walls thereof, a record disposed within said container and having a spindle receiving aperture therein, of tongues carried by the container openings adjacent each other, said tongues extending through the spindle receiving aperture and forming means for holding said record within the container.

In testimony whereof I hereunto affix my signature.

CHARLES A. FETTERS.